US012659890B2

(12) United States Patent
Liu et al.

(10) Patent No.: US 12,659,890 B2
(45) Date of Patent: Jun. 16, 2026

(54) WIRELESS COMMUNICATION METHOD AND APPARATUS, RELAY DEVICE, REMOTE DEVICE, AND BASE STATION

(71) Applicant: VIVO MOBILE COMMUNICATION CO., LTD., Chang'an (CN)

(72) Inventors: Jinhua Liu, Chang'an (CN); Xiaodong Yang, Chang'an (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 354 days.

(21) Appl. No.: 18/132,537

(22) Filed: Apr. 10, 2023

(65) Prior Publication Data

US 2023/0247572 A1 Aug. 3, 2023

Related U.S. Application Data

(63) Continuation of application No. PCT/CN2021/125751, filed on Oct. 22, 2021.

(30) Foreign Application Priority Data

Oct. 23, 2020 (CN) .......................... 202011150338.7

(51) Int. Cl.
*H04W 56/00* (2009.01)
*H04W 40/22* (2009.01)
(52) U.S. Cl.
CPC ......... *H04W 56/001* (2013.01); *H04W 40/22* (2013.01)
(58) Field of Classification Search
CPC ........... H04W 56/001; H04W 56/0025; H04W 56/0045; H04W 56/0055; H04W 56/0065; H04W 40/22; H04W 40/24; H04W 76/14; H04W 4/70; H04W 28/0252; H04W 56/0015; H04W 17/0446; H04W 72/23; H04W 72/25; H04W 7/30; H04W 24/02;
(Continued)

(56) References Cited

U.S. PATENT DOCUMENTS 11,696,219 B2 * 7/2023 Tang ..................... H04W 48/12
370/328
12,167,491 B2 * 12/2024 Xu ......................... H04W 76/25
(Continued)

FOREIGN PATENT DOCUMENTS

KR 20200036644 A 4/2020
WO 2019240548 A1 12/2019
(Continued)

OTHER PUBLICATIONS

Korean First Office Action related to Application No. 10-2023-7013511; reported on Mar. 6, 2024.
(Continued)

*Primary Examiner* — Jean A Gelin

(57) ABSTRACT

Embodiments of this application provide a wireless communication method and apparatus, a relay device, a remote device, and a base station. The wireless communication method includes: receiving, by the relay device, a configuration parameter of Uu interface of the base station; determining, by the relay device based on the configuration parameter, time information of a cell corresponding to the relay device; and transmitting, by the relay device, a message carrying the time information to a remote device.

17 Claims, 13 Drawing Sheets

(58) Field of Classification Search

CPC ........... H04L 27/26025; H04L 27/2602; H04L 27/2656; H04L 47/28

USPC ........................................................ 370/315

See application file for complete search history.

(56) References Cited

U.S. PATENT DOCUMENTS

| 2012/0213148 | A1* | 8/2012 | Saito ..................... H04L 5/0023 |
| | | | 370/315 |
| 2014/0241237 | A1 | 8/2014 | Speight et al. |
| 2018/0049235 | A1* | 2/2018 | Baghel .................. H04W 76/14 |
| 2018/0092027 | A1 | 3/2018 | Sheng |
| 2018/0206176 | A1 | 7/2018 | Panteleev et al. |
| 2020/0107236 | A1 | 4/2020 | Tseng et al. |
| 2020/0196387 | A1 | 6/2020 | Roy et al. |
| 2020/0229114 | A1 | 7/2020 | Ryu et al. |
| 2022/0086782 | A1* | 3/2022 | Chen ...................... H04L 5/001 |
| 2024/0244543 | A1* | 7/2024 | Peng ..................... H04J 3/0667 |

FOREIGN PATENT DOCUMENTS

| WO | 2020057410 A1 | 3/2020 |
| WO | 2020143756 A1 | 7/2020 |

OTHER PUBLICATIONS

International Search Report and Written Opinion related to Application No. PCT/CN2021/125751; reported on Jan. 18, 2022.

Chinese First Office Action related to Application No. 2020111503387; reported on Apr. 14, 2023,.

Ericsson, "Signalling to support UE-NW relay and Service continuity" 3GPP TSG-RAN WG2 #89bis, R2-151148, Apr. 20-24, 2015, Bratislava, Slovakia, Tdoc.

OPPO (Rapporteur). "Summary of [Post111-e][623][Relay] Remaining issues on relay discovery" 3GPP TSG-RAN WG2 #111-e, R2-2008815, Nov. 2020, E-meeting.

KT Corp., "Considerations on relay selection and reselection", 3GPP TSG-RAN WG2 Meeting #112-e, R2-2009634, Nov. 2-13, 2020, Online.

Sony, "Sidelink relay selection", 3GPP TSG-RAN WG2 Meeting #112 electronic, R2-2009892, Nov. 2020, Online.

Korean First Office Action related to Application No. 10-2024-7039122; reported on Dec. 6, 2024.

Extended Search Report related to Application No. 21882155.1; reported on Mar. 18, 2024.

Korean First Office Action related to Application No. 520170593699; reported on Mar. 6, 2024.

Indian First Office Action related to Application No. 202317029781; reported on Mar. 6, 2024.

3GPP TS 36.331 V16.2.1 (Sep. 2020), 3rd Generation Partnership Project; Technical Specification Group Radio Access Network; Evolved Universal Terrestrial Radio Access (E-UTRA); Radio Resource Control (RRC); Protocol specification (Release 16), 5G 3GPP A Global Initiative.

3GPP TS 38.331 V16.2.0 (Sep. 2020), 3rd Generation Partnership Project; Technical Specification Group Radio Access Network; NR; Radio Resource Control (RRC) protocol specification (Release 16), 5G 3GPP A Global Initiative.

Spreadtrum Communications, "Discussion on synchronization mechanism for NR V2X", 3GPP TSG-RAN WG1 Meeting #98bis, R1-1910008, Oct. 14-20, 2019, Chongqing, China.

Intel Corporation, "Sidelink synchronization for NR V2X Communication", 3GPP TSG-RAN WG1 Meeting #98bis, R1-1910651, Oct. 14-20, 2019, Chongqing, China.

Samsung, III—"WF on Conflict Resolution of D2D Frame Number" 3GPP TSG RAN WG1 #78, R1-143595, May 18-22, 2014, Dresden, Germany.

Korean Second Office Action related to Application No. 10-2024-7039122; reported on Aug. 19, 2025.

Huawei, HiSilicon—"SLSS transmission and PSBCH signalling for Rel-13 discovery" 3GPP TSG RA WG1 Meeting #81, R1-152468, May 25-29, 2015, Fukuoka, Japan.

MediaTek Inc.—"Discussion on sidelink based synchronization mechanism" 3GPP TSG RAN WG1 #98, R1-1908399, Aug. 26-30, 2019, Prague, Czech.

* cited by examiner

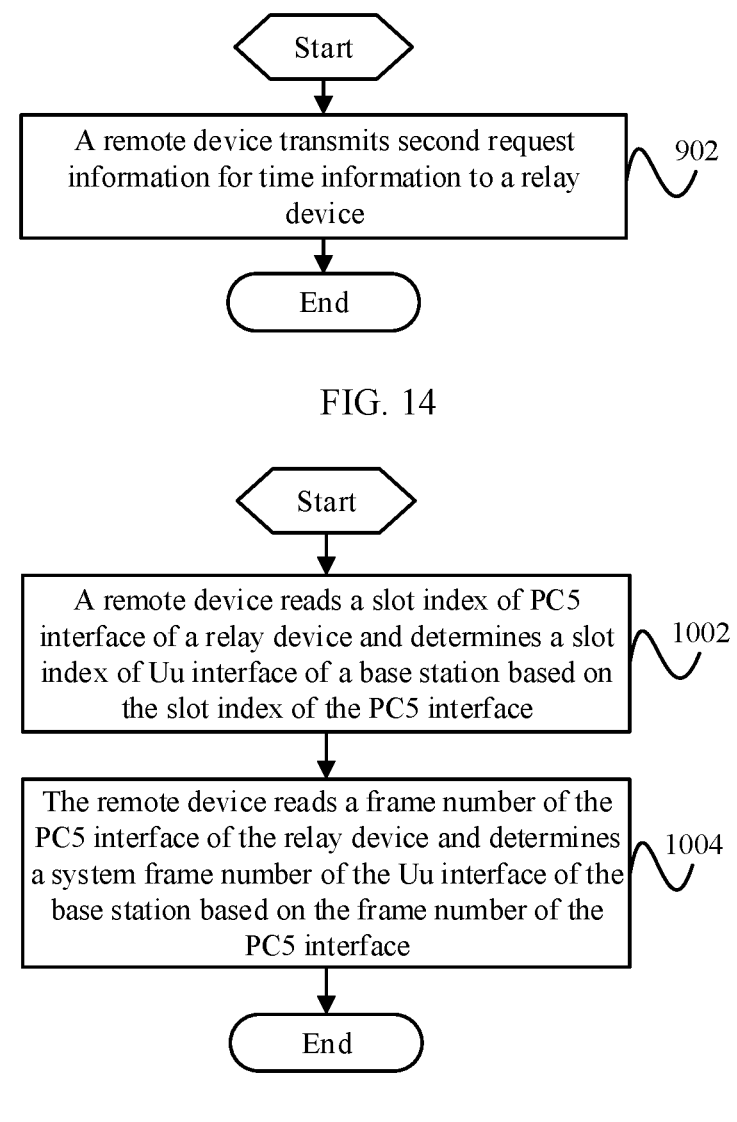
FIG. 14
FIG. 15
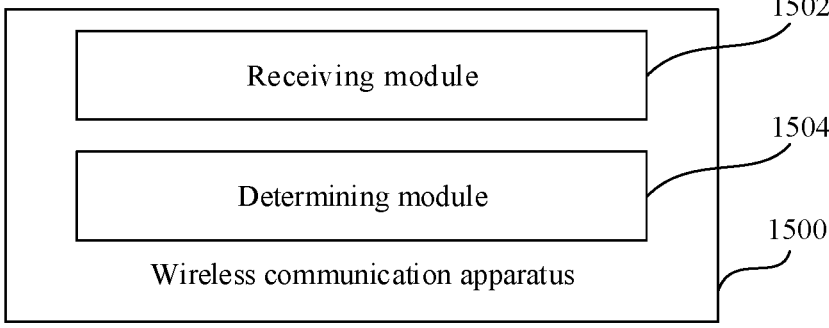
FIG. 16

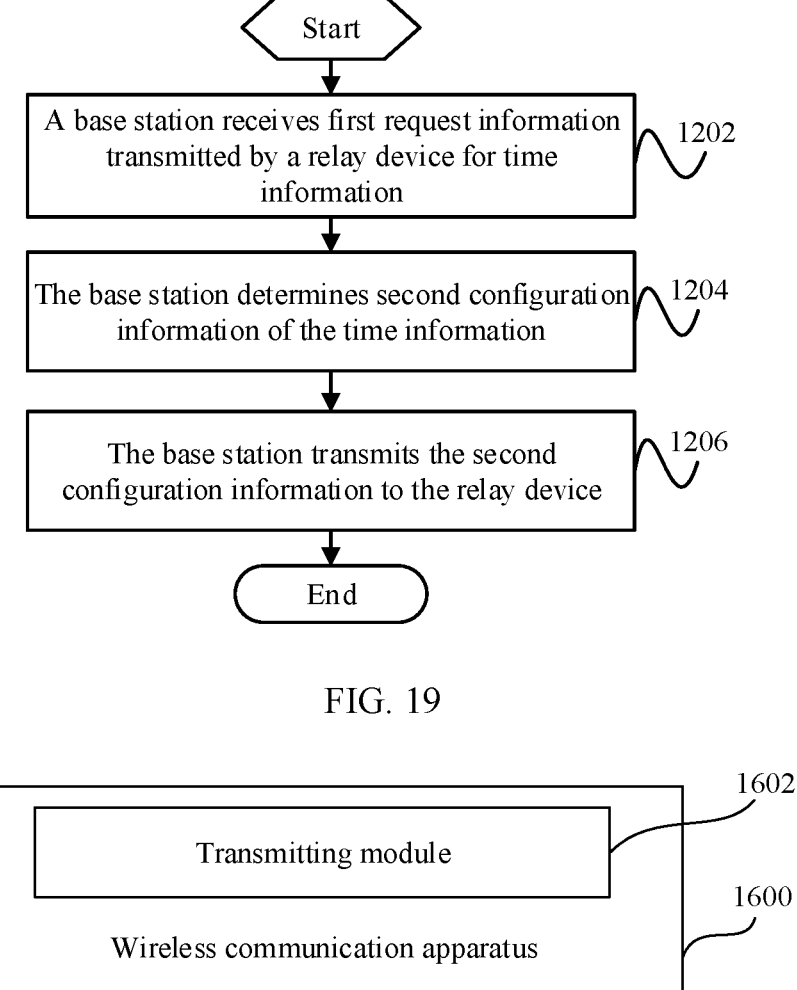

Start

A base station receives first request information transmitted by a relay device for time information  $\sim$ 1202

The base station determines second configuration information of the time information  $\sim$ 1204

The base station transmits the second configuration information to the relay device  $\sim$ 1206

End

FIG. 19

Transmitting module  1602

Wireless communication apparatus  1600

FIG. 20

WIRELESS COMMUNICATION METHOD AND APPARATUS, RELAY DEVICE, REMOTE DEVICE, AND BASE STATION

CROSS-REFERENCE TO RELATED APPLICATIONS

This application is a continuation application of PCT Application No. PCT/CN2021/125751 filed on Oct. 22, 2021, which claims priority to Chinese Patent Application No. 202011150338.7, filed in China on Oct. 23, 2020, disclosures of which are incorporated herein by reference in their entireties.

TECHNICAL FIELD

This application relates to the field of communication technologies, and in particular, to a wireless communication method, a wireless communication apparatus, a relay device, a remote device, a base station, and a readable storage medium.

BACKGROUND

In the fifth generation (5G) mobile communication technologies, as a large number of devices are connected to the cellular network, the core network is subjected to sharply increased pressure. The 3GPP (the third generation parmership project) has proposed device-to-device (D2D) communication to serve near-field scenarios. Power-limited remote devices (remote UE) can implement communication with a base station (gNB) through a relay device (relay user equipment, relay UE), reducing the power consumption of the remote devices. In principles of communication, communication can be implemented through the Uu interface (an interface between user equipment and a base station) and the PC5 interface (an interface between user equipments). A link between a remote device and a relay device is called sidelink (sidelink), a wireless link between sidelinks is called a PC5 link, and a link between a relay device and a base station is called Uu link (Uulink).

In the related art, when a remote device is engaged in relay communication, both the serving cell system message and the single sideband (SSB) physical signal are required for determining a specific time of Uu interface of a relay device. However, a remote device outside coverage of a serving cell cannot obtain information such as a system frame number of the Uu interface via a system message forwarded by the relay device. Consequently, the remote device is unable to accurately predict a transmission time window position of a broadcast signal transmitted over the Uu interface, for example, an SSB signal, a physical broadcast channel (PBCH) signal, or a system information signal (SIB), resulting in the remote device being blind to a wireless cell, leading to not only a large delay, but also high power consumption. In addition, a base station is unable to configure a measurement gap (MG) for the remote device outside coverage, such that the remote device cannot find a target cell in a timely manner according to the measurement gap, failing to guarantee communication service continuity.

SUMMARY

According to a first aspect, an embodiment of this application provides a wireless communication method including:

receiving, by a relay device, a configuration parameter of Uu interface of a base station;

determining, by the relay device based on the configuration parameter, time information of a cell corresponding to the relay device; and transmitting, by the relay device, a message carrying the time information to a remote device.

According to a second aspect, an embodiment of this application provides a wireless communication method including:

receiving, by a remote device, a message transmitted by a relay device;

determining, by the remote device based on time information of a cell corresponding to the relay device in the message, a transmission time window position of a discovery signal of the cell and/or a neighboring cell of the cell; and/or parsing out, by the remote device, cell measurement configuration information based on the time information of the cell corresponding to the relay device in the message.

According to a third aspect, an embodiment of this application provides a wireless communication method including:

transmitting, by a base station, a configuration parameter of Uu interface of the base station to a relay device.

According to a fourth aspect, an embodiment of this application provides a wireless communication apparatus including:

a receiving module, configured to receive a configuration parameter of Uu interface of a base station;

a determining module, configured to: based on the configuration parameter, determine time information of a cell corresponding to the relay device; and a transmitting module, configured to transmit a message carrying the time information to a remote device.

According to a fifth aspect, an embodiment of this application provides a wireless communication apparatus including:

a receiving module, configured to receive a message transmitted by a relay device; and a determining module, configured to determine, based on time information of a cell corresponding to the relay device in the message, a transmission time window position of a discovery signal of the cell and/or a neighboring cell of the cell; and/or parse out cell measurement configuration information based on the time information of the cell corresponding to the relay device in the message.

According to a sixth aspect, an embodiment of this application provides a wireless communication apparatus including:

a transmitting module, configured to transmit a configuration parameter of Uu interface of a base station to a relay device.

According to a seventh aspect, an embodiment of this application provides a relay device including a processor, a memory, and a program or instructions stored in the memory and capable of running on the processor, where when the program or instructions are executed by the processor, the steps of the wireless communication method according to the first aspect are implemented.

According to an eighth aspect, an embodiment of this application provides a remote device including a processor, a memory, and a program or instructions stored in the memory and capable of running on the processor, where when the program or instructions are executed by the processor, the steps of the wireless communication method according to the second aspect are implemented.

According to a ninth aspect, an embodiment of this application provides a base station including a processor, a memory, and a program or instructions stored in the memory and capable of running on the processor, where when the program or instructions are executed by the processor, the steps of the wireless communication method according to the third aspect are implemented.

According to a tenth aspect, an embodiment of this application provides a readable storage medium, where the readable storage medium stores a program or instructions, and when the program or instructions are executed by a processor, the steps of the wireless communication method according to the first aspect, the second aspect, or the third aspect are implemented.

According to an eleventh aspect, an embodiment of this application provides a chip, where the chip includes a processor and a communications interface, the communications interface is coupled to the processor, and the processor is configured to run a program or instructions to implement the steps of the wireless communication method according to the first aspect, the second aspect, or the third aspect.

BRIEF DESCRIPTION OF DRAWINGS

FIG. 14 is a ninth flowchart of a wireless communication method according to an embodiment of this application;

FIG. 15 is a tenth flowchart of a wireless communication method according to an embodiment of this application;

FIG. 16 is a third structural block diagram of a wireless communication apparatus according to an embodiment of this application;

FIG. 19 is a twelfth flowchart of a wireless communication method according to an embodiment of this application;

FIG. 20 is a fifth structural block diagram of a wireless communication apparatus according to an embodiment of this application;

DESCRIPTION OF EMBODIMENTS

To more clearly understand the foregoing purposes, features, and advantages in this application, the following further describes in detail this application with reference to the accompanying drawings and specific embodiments. It should be noted that, in absence of conflicts, the embodiments and features in the embodiments in this application may be mutually combined.

The following describes many specific details for full understanding of this application. However, this application may be implemented in another manner different from the following description. Therefore, the scope of protection of this application is not limited by the specific embodiments disclosed in the following.

The following describes a wireless communication method, a wireless communication apparatus, a relay device, a remote device, a base station, and a readable storage medium according to some embodiments of this application with reference to FIG. 1 to FIG. 25.

Figures 1, 2:
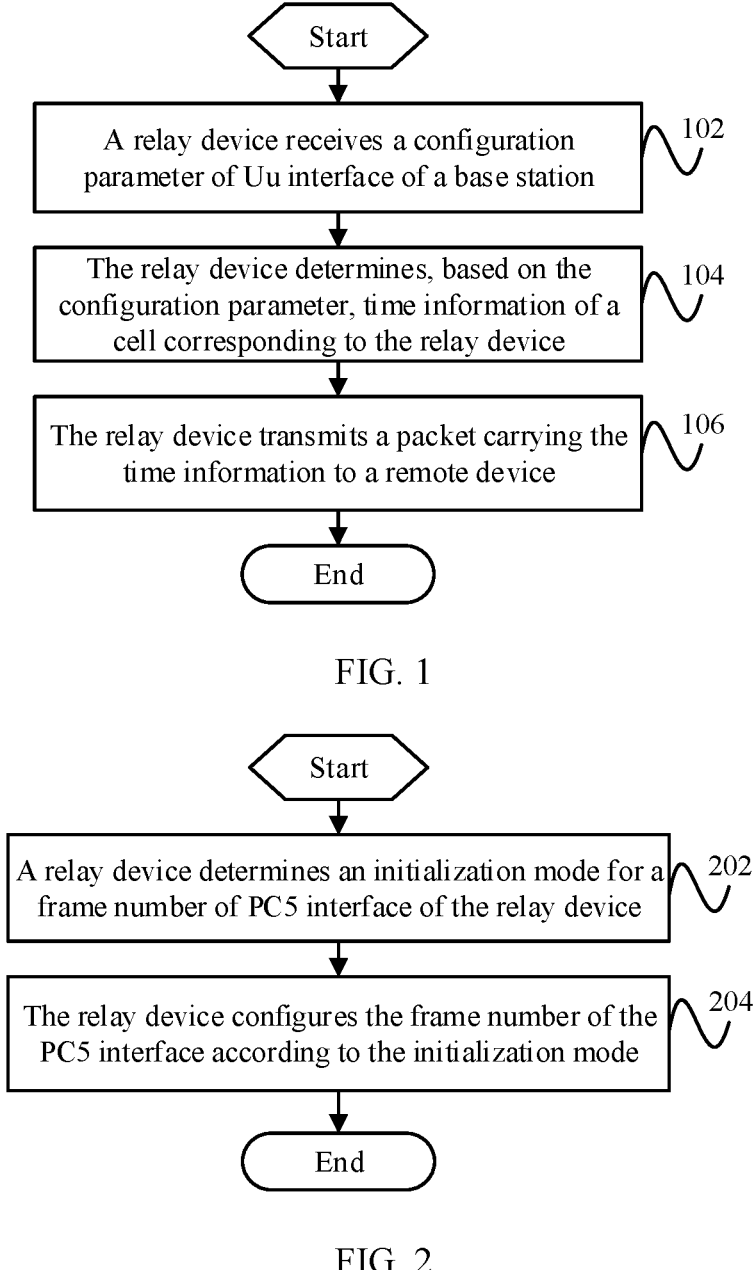
FIG. 1 is a first flowchart of a wireless communication method according to an embodiment of this application.
FIG. 2 is a second flowchart of a wireless communication method according to an embodiment of this application.

In an embodiment of this application, FIG. 1 is a first flowchart of a wireless communication method according to an embodiment of this application, including step 102, step 104, and step 106.

Step 102. A relay device receives a configuration parameter of Uu interface of a base station.

Figure 7:
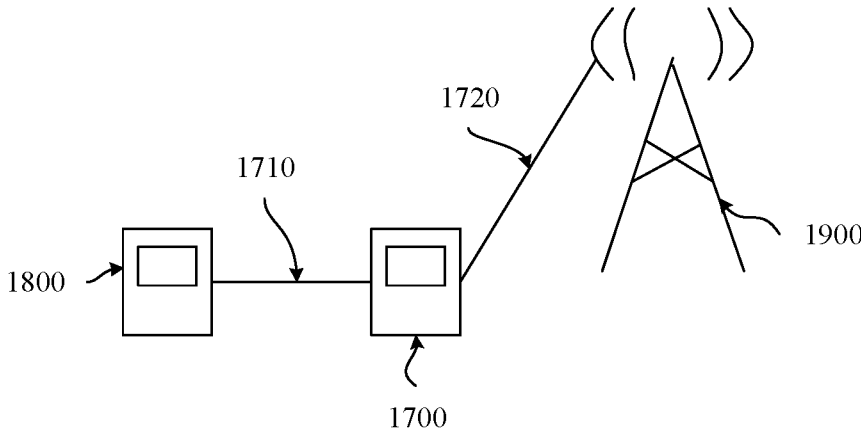
FIG. 7 is a schematic diagram of a communication scenario according to an embodiment of this application.

FIG. 7 is a schematic diagram of a communication scenario according to an embodiment of this application. In a new radio (NR) or long-term evolution (LTE) communication system, a remote device 1800 and a relay device 1700 communicate through a sidelink 1710, and the relay device 1700 and a base station 1900 communicate through a Uu link 1720.

The sidelink runs the PC5 interface protocol. For example, the sidelink wireless interface control plane runs the PC5 RRC protocol, and the sidelink operates above the message data convergence protocol (PDCP) layer and the radio link control (RLC) layer. The media access control (MAC) layer and the physical layer are at the bottom. The sidelink wireless interface user plane includes the service data adaptation protocol (SDAP) layer, PDCP layer, RLC layer, MAC layer, and physical layer from top to bottom. The Uu link runs the Uulink protocol.

It should be noted that a network communication standard framework in this application, that is, the Open Systems Interconnection reference model (OSI), divides the entire communication function into seven layers. The lower three layers of the OSI reference model, responsible for creating network communication connection links, are the physical layer, the data link layer, and the network layer.

The physical layer defines a physical structure of a network, an electromagnetic standard of transmission, bitstream coding, and a network time principle, for example, time division multiplexing and frequency division multiplexing, and determines a network connection type (end-to-end or multi-end connection) and a physical topology.

The data link layer is used to establish a data link connection between two devices, transmit data signals to the physical layer, and process the signals for error-free and appropriate transmission. Specifically, the data link layer includes MAC (Media Access Control) layer, RLC (Radio Link Control), BMC (Broadcast/Multicast Control) layer, and PDCP (Message Data Convergence Protocol) layer. Data can be transmitted and received between the MAC layer and the physical layer through a transport channel.

The network layer is used to select an appropriate path to perform congestion control and other functions. The network layer includes the radio resource control (RRC) layer used to control logical channels, transport channels, and physical channels.

Figure 8:
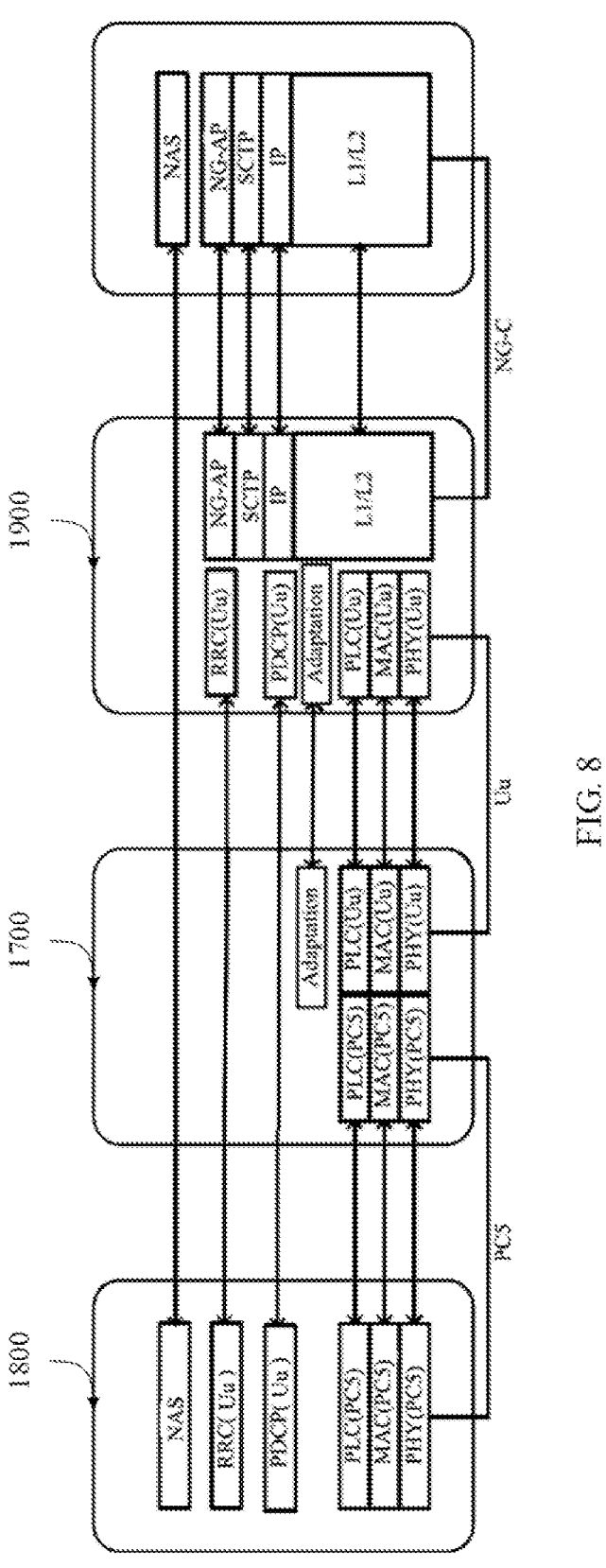
FIG. 8 is a schematic diagram of a backhaul link control plane protocol stack of a layer 2 relay device according to an embodiment of this application.
Figure 9:
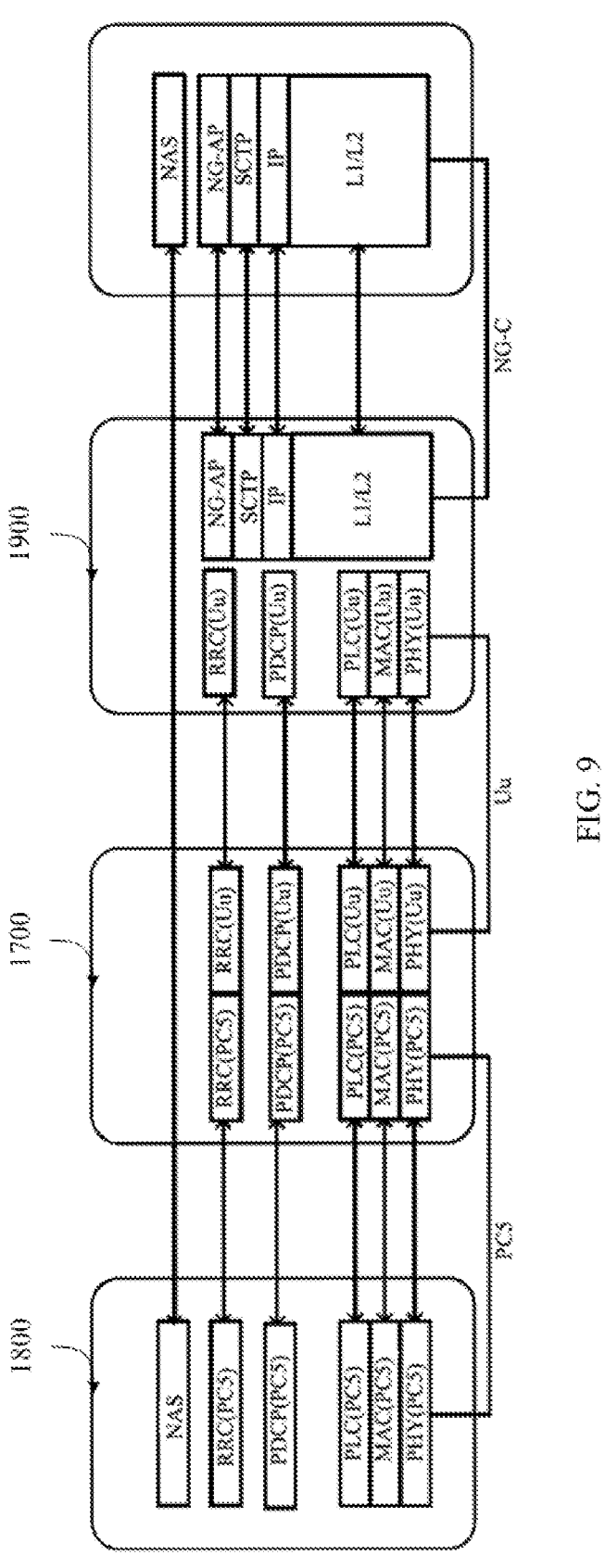
FIG. 9 is a schematic diagram of a backhaul link control plane protocol stack of a layer 3 relay device according to an embodiment of this application.

Specifically, FIG. 8 is a schematic diagram of a backhaul link control plane protocol stack of a layer 2 relay device according to an embodiment of this application. On a backhaul link of a layer-2 sidelink relay device 1700, a remote device 1800 has a PC5-RRC connection used to control a sidelink connection, and also has an RRC connection to a base station 1900 to control a connection to the base station 1900 and service provision. The backhaul link of the layer-2 sidelink relay device 1700 is not limited to a Uu RRC protocol stack shown in FIG. 8. FIG. 9 is a schematic diagram of a backhaul link control plane protocol stack of a layer 3 relay device according to an embodiment of this application. On a backhaul link of a layer 3 sidelink relay device 1700, the remote device 1800 has only a PC5-RRC connection to the relay device 1700, with no Uu-RRC connection to the base station 1900. A backhaul link is a wireless link used in communication between a remote device and its upper-level base station, including uplink transmission and downlink transmission links.

Step 104. The relay device determines, based on the configuration parameter, time information of a cell corresponding to the relay device.

Specifically, the cell corresponding to the relay device includes a cell serving the relay device in an active state or a cell where the relay device in an inactive state camps.

Further, the time information includes at least one of the following: identity information of the cell (cell ID), system frame number (SFN) of the Uu interface, slot number of the Uu interface, OFDM (orthogonal frequency division multiplexing) symbol sequence number of the Uu interface, subcarrier spacing of the Uu interface, or offset between the system frame number of the Uu interface and a frame number of PC5 interface of the relay device.

It should be noted that, generally, different subcarrier spacings have different applicable frequency bands. For example, with a normal CP (cyclic prefix), low frequency (less than 6 GHz) data and control channels use subcarrier spacings of 15 KHz and 30 KHz, while high-frequency data channels use subcarrier spacings of 60 KHz and 120 KHz. In a case of different subcarrier spacings, slots and symbols have different lengths. Therefore, a time length of a slot/symbol of the Uu interface can be determined according to a subcarrier spacing. The system frame number is a number of a system frame in which the time information of the Uu interface is transmitted, and an OFDM symbol sequence number is related to the current transmission, for example, the beginning or the end. After the remote device establishes a PC5 link to the relay device, the remote device can read related parameters of the PC5 interface, such as a time slot number and frame number (Direct Frame Number, DFN) of the PC5 interface. A system frame number of the Uu interface can be obtained based on the DFN and an offset between an SFN of the Uu interface of the relay device and a DFN of the PC5 interface of the relay device. This also prevents any errors caused by time offset between the Uu interface and the PC5 interface when the relay device forwards a system message.

In this embodiment, according to parameters in the communication protocol or configuration from a cell, the relay device generates time information of the cell based on time-related information obtained from the Uu interface, that is, time information of a sidelink Uu interface. The time information indicates time information of Uu interface corresponding to a selected sidelink reference time position. Before accessing a cell, a remote device needs to obtain time information of the cell.

Specifically, for example, a remote terminal in layer 2 and layer 3 sidelink relay (SL-relay) structures can predict, based on time information, a possible time position for transmitting an SSB of a cell where the relay device is located and a possible time position for transmitting an SSB of a neighboring cell of a cell where the relay device is located, so as to perform measurement and cell reselection. A remote terminal in the layer-2 sidelink relay structure can parse out, based on time information, time-related configurations in radio resource control (RRC) messages, for example, measurement configuration, measurement gap (measurement gap), and a measurement report.

Step 106. The relay device transmits a message carrying the time information to the remote device.

In this embodiment, the relay device can provide the time information of the cell to the remote device through a sidelink in relay communication of the remote device. Therefore, even though the remote device is outside the coverage of the cell, the remote device can still determine a cell time window or understand measurement configuration based on the time information transmitted by the relay device, so as to perform measurement gap configuration and cell reselection. This reduces measurement power and measurement time of the remote device, thus improving service continuity of the remote device in a moving state.

Specifically, an SFN parameter of a master information block (MIB) in the message indicates highest 6 bits of a system frame number, and a channel code of physical broadcast channel (PBCH) in the message indicates lowest 4 bits of the system frame number. The message predefines an SSB transmission timing relationship, a transmission time position, a sequence number, and the like, so that the remote device can obtain a slot number and a symbol sequence number in within the system frame.

Specifically, for example, for a layer 2 or layer 3 sidelink relay structure, it can be predefined that the relay device automatically transmits time information of a sidelink Uu interface to the remote device through a sidelink, that is, after a communication link is established between the remote device and the relay device, the relay device actively provides corresponding time information to the remote device.

In an embodiment of this application, FIG. 2 is a second flowchart of a wireless communication method according to an embodiment of this application.

Step 202. The relay device determines an initialization mode for the frame number of the PC5 interface of the relay device.

Step 204. The relay device configures the frame number of the PC5 interface according to the initialization mode.

Step 204 specifically includes the following two manners.

Manner 1. An initial value of the frame number of the PC5 interface is configured to a value of the system frame number of the Uu interface.

In this embodiment, the relay device assigns a value to the frame number of the PC5 interface through an initialization operation, and initializes the frame number of the PC5 interface to a same value as the system frame number of the Uu interface. In this way, the remote device can obtain the system frame number of the Uu interface directly from the frame number of the PC5 interface, thus avoiding directly transmitting the system frame number of the Uu interface in the message, reducing transmission resources and improving the configuration efficiency of the remote device.

Manner 2. The frame number of the PC5 interface is initialized according to a preset offset between the system frame number of the Uu interface and the frame number of the PC5 interface.

In this embodiment, the relay device presets a preset offset between the system frame number of the Uu interface and the frame number of the PC5 interface, that is, a correspondence between the system frame number of the Uu interface and the frame number of the PC5 interface. A new value is assigned to the frame number of the PC5 interface according to the preset offset and the system frame number of the Uu interface. The remote device can calculate the system frame number of the Uu interface after obtaining the frame number of the PC5 interface and the preset offset. This avoids transmitting the system frame number of the Uu interface directly in the message, thereby reducing transmission resources and improving the configuration efficiency of the remote device.

Specifically, a process of obtaining the preset offset specifically includes the following steps:

the relay device receives a first input to the relay device, and the relay device determines the preset offset in response to the first input; or the relay device receives first configuration information transmitted by the base station, and the relay device determines the preset offset according to the first configuration information.

In this embodiment, the relay device may determine the preset offset according to a user operation, or may obtain the preset offset from the first configuration information transmitted by the base station. The first configuration information includes system information (SIB) or dedicated radio resource control (RRC) information.

Figures 3, 4:
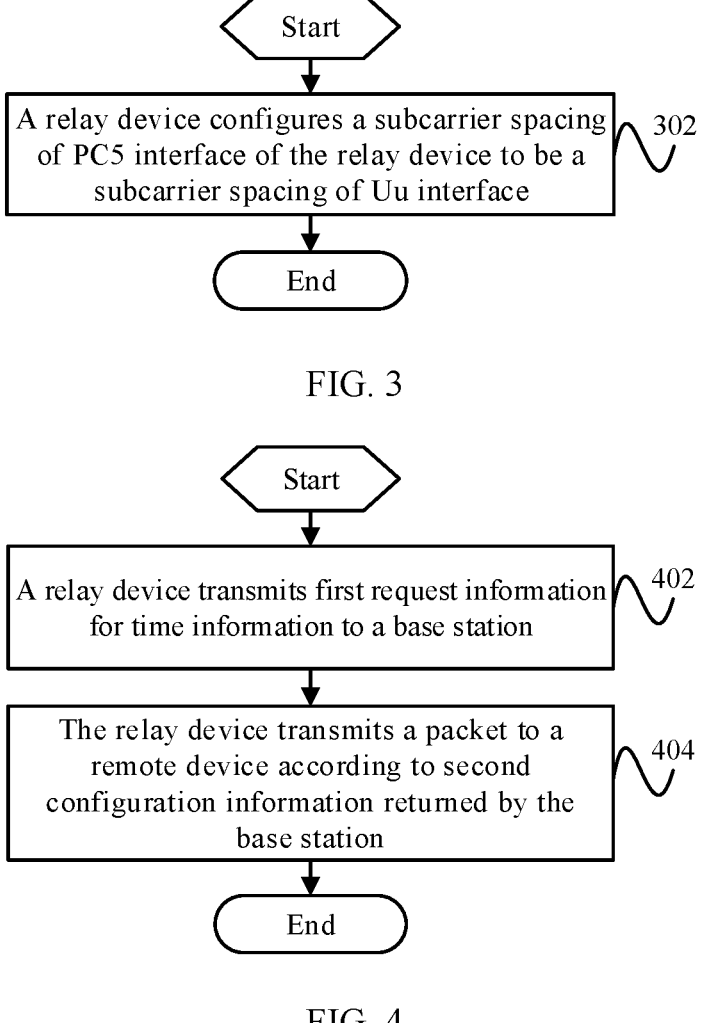
FIG. 3 is a third flowchart of a wireless communication method according to an embodiment of this application.
FIG. 4 is a fourth flowchart of a wireless communication method according to an embodiment of this application.

In an embodiment of this application, FIG. 3 is a third flowchart of a wireless communication method according to an embodiment of this application, including step 302.

Step 302. The relay device configures a subcarrier spacing of the PC5 interface of the relay device to be the subcarrier spacing of theUu interface.

In this embodiment, because the subcarrier spacing can be used for determining a time length of a slot/symbol, it can be preset that a sidelink of the relay device uses a same subcarrier spacing (SCS) as the Uu interface, so that the slot number of the PC5 interface is the same as the slot number of the Uu interface, and the frame number of the PC5 interface is the same as the system frame number of the Uu interface. In this case, the remote device can obtain the system frame number and slot number of the Uu interface directly based on the frame number and slot number of the PC5 interface, requiring no transmission of the system frame number and the slot number of the Uu interface, thereby reducing transmission resources.

In an embodiment of this application, the relay device can receive the configuration parameter of the Uu interface of the base station in the following manners.

Manner 1. The relay device reads the configuration parameter of the Uu interface.

In this embodiment, after a communication link is established between the base station and the relay device, the relay device can read the configuration parameter of the Uu interface through the Uu link to the base station, and the relay device can determine the time information of a cell of the base station based on the configuration parameter. The relay device then transmits the message carrying the time information to the remote device, so as to provide the time information to the remote device outside coverage of the cell with, so that the remote device can perform measurement gap configuration and cell reselection based on the time information, effectively reducing constraints imposed by cell coverage and ensuring service continuity of the remote device.

Specifically, for example, in the layer 3 sidelink relay structure, the relay device can read related parameters of the Uu interface, and then notify the remote device by using PC5 radio resource control (RRC) or a PC5 medium access control control element (MAC CE), so that the remote device can obtain the time information.

Manner 2. The relay device receives the configuration parameter of the Uu interface transmitted by the base station.

In this embodiment, after the base station establishes a communication link with the relay device, the base station actively transmits the configuration parameter of the Uu interface to the relay device. After receiving the configuration parameter, the relay device generates, based on the configuration parameter, a message containing the corresponding time information, so as to forward the time information to the remote device. In this way, the remote device can perform measurement gap configuration and cell reselection based on the time information, effectively reducing constraints imposed by cell coverage and ensuring the service continuity of the remote device.

Specifically, for example, for the layer-2 sidelink relay structure, because the relay device has no Uu-RRC connection to the base station, but the remote device has a Uu-RRC connection to the base station, the base station can forward the cell time information to the remote device through the relay device in a form of RRC signaling, and the remote device obtains the time information based on the received RRC signaling.

In an embodiment of this application, FIG. 4 is a fourth flowchart of a wireless communication method according to an embodiment of this application. Step 106 specifically includes step 402 and step 404.

Step 402. The relay device transmits first request information for the time information to the base station.

The first request information includes user information and the like of the remote device and the relay device.

Step 404. The relay device transmits the message to the remote device according to second configuration information returned by the base station.

The second configuration information includes at least one of the following: time configuration message, permission information, or rejection information. The time configuration message includes a time configuration parameter related to the remote device. For example, if the base station confirms the configuration, the second configuration information includes the time configuration message and permission information; or if the base station rejects the configuration, the second configuration information includes rejection information.

In this embodiment, before transmitting the message carrying the time information to the remote device, the relay device first transmits the first request information for the time information to the corresponding base station to ask the base station whether to provide the time information to the remote device. If confirming the configuration, the base station returns the permission information of the configuration. The relay device transmits the time information to the remote device according to the permission information returned by the base station. If rejecting the configuration, the base station returns the rejection information of the configuration. The relay device does not transmit the time information to the remote device according to the rejection information returned by the base station. In this way, access permission of the remote device can be further set using the first request information, improving security of the communication system.

Specifically, for example, for the layer 3 sidelink relay structure, the relay device has an RRC connection channel to the base station. It can be predefined that the relay device transmits the time information of the Uu interface through a sidelink only after receiving the permission configuration from the serving base station. Further, the base station can use dedicated RRC signaling or system messages to transmit related configurations.

Figures 5, 6:
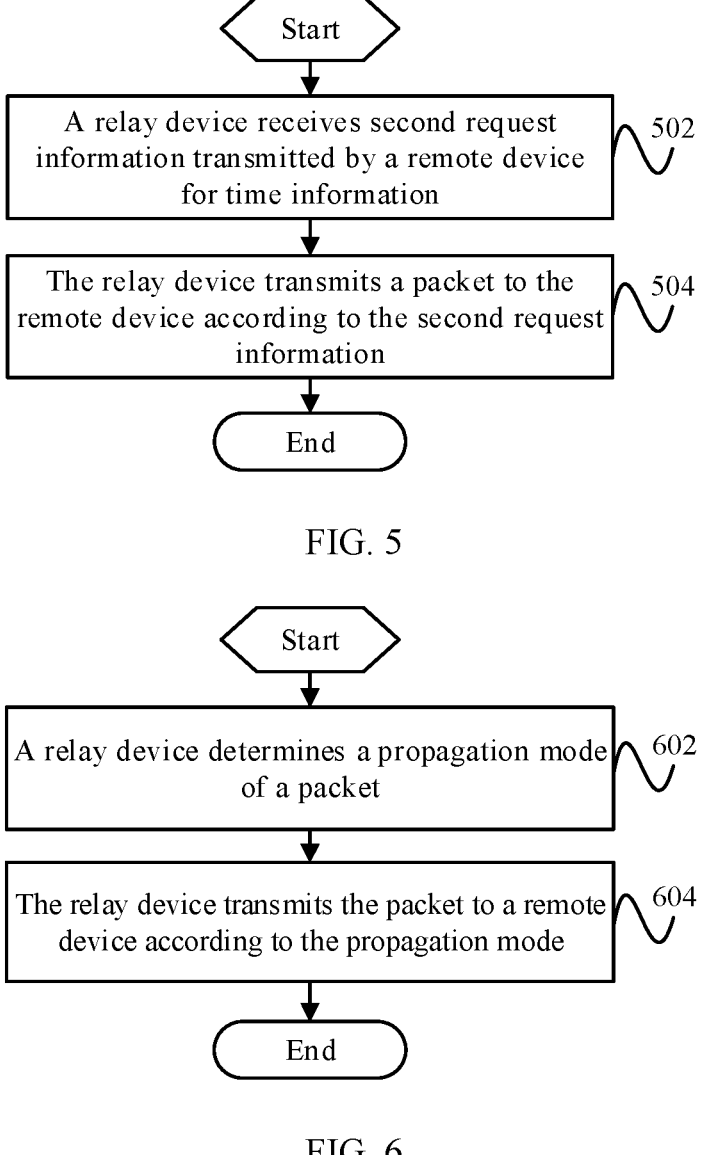
FIG. 5 is a fifth flowchart of a wireless communication method according to an embodiment of this application.
FIG. 6 is a sixth flowchart of a wireless communication method according to an embodiment of this application.

In an embodiment of this application, FIG. 5 is a fifth flowchart of a wireless communication method according to an embodiment of this application. Step 106 specifically includes step 502 and step 504.

Step 502. The relay device receives second request information transmitted by the remote device for the time information.

Step 504. The relay device transmits the message to the remote device according to the second request information.

The second request information contains user information of the remote device and the required time information.

In this embodiment, when needing to access a cell, the remote device needs to obtain at least time information of the cell, so as to facilitate measurement and cell reselection. In this case, the remote device can transmit the second request information for the time information to the relay device. The relay device transmits the message carrying the time information to the remote device only after receiving the second request information. This avoids resource occupation issues caused by continuous transmission of time information to the remote device by the relay device, and is conducive to transmission resource allocation, improving communication efficiency and stability.

In an embodiment of this application, FIG. 6 is a sixth flowchart of a wireless communication method according to an embodiment of this application. Step 106 specifically includes step 602 and step 604.

Step 602. The relay device determines a propagation mode of the message.

The propagation mode includes unicast mode or broadcast mode.

Step 604. The relay device transmits the message to the remote device according to the propagation mode.

In this embodiment, after receiving the second request information transmitted by the remote device, the relay device can transmit the message to the remote device in the response information for the remote device, so as to periodically broadcast the message.

Specifically, before the relay device broadcasts the message carrying the time information to the remote device, the relay device receives third configuration information transmitted by the network device, and configures a broadcast message identifier according to the third configuration information. That is, the network device configures independent broadcast message identifiers for the relay device and the remote device, so as to broadcast time information of Uu interface.

In an embodiment of this application, the message includes at least one of the following: sidelink master information block (SL-MIB), sidelink signalling radio bearer (SL-SRB), and discovery signal.

Sidelink management information includes update indication information of the time information; and the update indication information is used for the remote device to determine the time information. In this embodiment, the relay device indicates in an SL-MIB message whether there is a Uu interface time update. In a case that the update indication information indicates that there is another Uu interface time message, the remote device receives the another Uu interface time message to determine the time information of the Uu interface. In a case that the update indication information indicates that there are no other Uu interface time messages, the remote device obtains time information of Uu interface from the current SL-MIB message. Therefore, the remote device can receive latest time information according to the update indication information.

Specifically, one reserved bit in the SL-MIB message can be used as the update indication information.

Specifically, for example, in the vehicle data transmission scheme based on the 3GPP communication protocol, a v2x (Vehicle to X, vehicle to specific target communication) SL-MIB contains a slot number, and only the time information other than the slot number needs to be added to the SL-MIB.

In addition, in a case that the relay device uses a sidelink signalling radio bearer to transmit time information to the remote device, the sidelink signalling radio bearer may be any radio bearer for establishing an RRC connection, for example, any one of SL-SRB0, SL-SRB1, SL-SRB2, and SL-SRB3; or may be a new sidelink signalling radio bearer configured through a relay device, for example, SL-SRB4 and SL-SRB5.

In an embodiment of this application, a cell includes at least one of the following: primary cell, secondary cell, and primary secondary cell.

In this embodiment, in carrier aggregation (CA), two or more component carriers (CC) are aggregated to support a higher transmission bandwidth up to 100 MHz. In a case that the user equipment is in a single connectivity state, the user equipment can communicate with the base station through multiple component carriers simultaneously after entering a connected state, and the base station designates a primary component carrier (PCC) for the user equipment through explicit configuration or in accordance with a protocol. Other component carriers are referred to as secondary component carriers (SCC), and a cell on the primary component carrier is referred to as a primary cell (Pcell), that is, a cell operating on a primary frequency band. A cell on a secondary component carrier is referred to as a secondary cell (Scell), that is, a cell operating on a secondary frequency band. In a case that the user equipment is in a dual connectivity (DC) state, multiple cells are deployed in the network, that is, an MCG (master cell group) and an SCG (secondary cell group). In the SCG a cell on a primary component carrier is called a primary secondary cell (PScell) and a cell on a secondary component carrier is called a secondary cell. User equipment can obtain time information of different cells as required.

It can be predefined that the relay device transmits at least time information of Uu interface of a PCell of the relay device through a sidelink.

Specifically, single connectivity is configured for the relay device, primary cell carriers and secondary cell carriers are aggregated, and when a PC5 link uses a secondary cell resource, the relay device determines time information of a primary cell and/or secondary cell according to configuration parameters and transmit the time information to the remote device. Dual connectivity is configured for the relay device, and the relay device determines time information of a primary cell and/or primary secondary cell according to configuration parameters and transmit the time information to the remote device. For example, in a case that the relay device is in an EN-DC connected state, the relay device transmits only time information of Uu interface of a PSCell through a sidelink.

Specifically, for example, the relay device obtains time-related information from the Uu interface according to a predefinition in the protocol or a configuration from a cell, generates time information of the Uu interface, and transmits the time information to the remote device through a sidelink.

The time information includes one or more of the following content: cell ID, system frame number, slot number, and OFDM symbol sequence number; optionally, the time information of Uu interface further includes SCS information corresponding to the Uu interface of the cell, so as to help the remote device to determine a time length of one slot/symbol of the Uu interface. Time information of a sidelink Uu interface indicates Uu interface time information corresponding to a selected sidelink reference time position. A cell ID is an ID of a current cell of the relay device, a system frame number is a number of a system frame in which the time information of the Uu interface is transmitted, and an OFDM symbol sequence number is based on a frame corresponding to the current transmission, for example, the start or the end of the frame.

Specifically, for a layer-2 sidelink relay structure, the base station uses RRC signaling to transmit an offset between an SFN of Uu interface of a PCell/PSCell and a DFN of PC5 interface of the relay device to the remote device, and the remote device calculates the SFN of the cell of the relay device based on the DFN received over the PC5 interface and the offset. In another manner, for a layer or layer 3 sidelink relay structure, the relay device uses PC5 RRC or PC5 MAC control element to notify the remote device of an offset between an SFN of Uu interface of a PCell/PSCell and a DFN of PC5 interface of the relay device, and the remote device calculates the SFN of the cell PCell/PSCell of the relay device based on the DFN received over the PC5 interface and the offset.

Optionally, the time information of the sidelink Uu interface can be transmitted to the remote device by using one of the following methods:

1. The time information is carried in an SL-MIB and transmitted to the remote device. Specifically, in a case that a v2xSL-MIB already has a slot number, a system frame number of the Uu interface may be further included, or the offset is included in the SL-MIB message for broadcasting.

2. An SL-SRB, for example, any one of SL-SRB0, 1, 2, or 3, is used for transmission to the remote device. Certainly, a new SL-SRB may be defined to transmit the time information of the sidelink Uu interface.

3. The time information of the sidelink Uu interface is included in a discovery signal and transmitted to the remote device.

Optionally, after receiving a request from the remote device, the relay device can transmit the time information to the remote device in a response message, or broadcast the time information periodically.

Optionally, for a layer 2 or layer 3 sidelink relay structure, it can be defined that the relay device transmits the time information of the sidelink Uu interface through a sidelink, so that the remote device can obtain the time information transmitted by the relay device after being connected to the relay device.

Optionally, for a layer 3 sidelink relay structure, the relay device transmits the time information of the sidelink Uu interface through a sidelink only after receiving a permission configuration from the base station. The base station can use dedicated RRC signaling or system messages to transmit related configurations.

Optionally, it can be defined that the relay device initializes a DFN to a same value as the Uu interface frame number during DFN initialization, so that the remote device can directly obtain the system frame number of the Uu interface based on the DFN, not requiring additional broadcasting of the Uu interface system frame number. In another implementation, it can be predefined that a sidelink of the relay device uses a same SCS as the Uu interface, so that a slot number of the PC5 interface is the same as a slot number of the Uu interface, and the remote device can obtain the system frame number of the Uu interface directly based on the DFN, also not requiring broadcasting of the system frame number and slot index of the Uu interface.

Optionally, the relay device indicates in the SL-MIB message whether there is time indication information of the Uu interface to be transmitted. For example, one reserved bit is used for indication. In a case that presence of another Uu interface time message is indicated, the remote device needs to receive the another Uu interface time message to determine the time of the Uu interface; or in a case that presence of no other Uu interface time messages is indicated, the remote device obtains the time information of the Uu interface from an SL-MIB message.

Optionally, it can be defined that the relay device transmits at least time information of Uu interface of a PCell of the relay device through a sidelink.

Specifically, in a case that the relay device is configured with single connectivity and carrier aggregation, and a PC5 link uses a secondary cell resource, the base station can configure the relay device to transmit time information of a PCell or time information of Uu interface of a secondary cell through a sidelink.

For example, in a case that the relay device is configured with dual connectivity, the relay device can transmit time information of Uu interface of a PCell and/or PSCell through a sidelink. For example, in a case that the relay device is in an EN-DC connected state, the relay device transmits only time information of Uu interface of a PSCell through a sidelink.

In this embodiment, the remote device outside the coverage of the cell can obtain information related to the system time by detecting a MIB and an SSB of the Uu interface. After receiving time information of a sidelink Uu interface, the remote device determines time information of Uu interface of a corresponding cell, and then determines a cell measurement window or executes a received measurement gap configuration. This reduces measurement power and measurement time of the remote device, and improves the service continuity of the remote device in a moving state.

Optionally, the upper layer configures a special group ID for broadcasting time information of a sidelink Uu interface.

Figure 10:
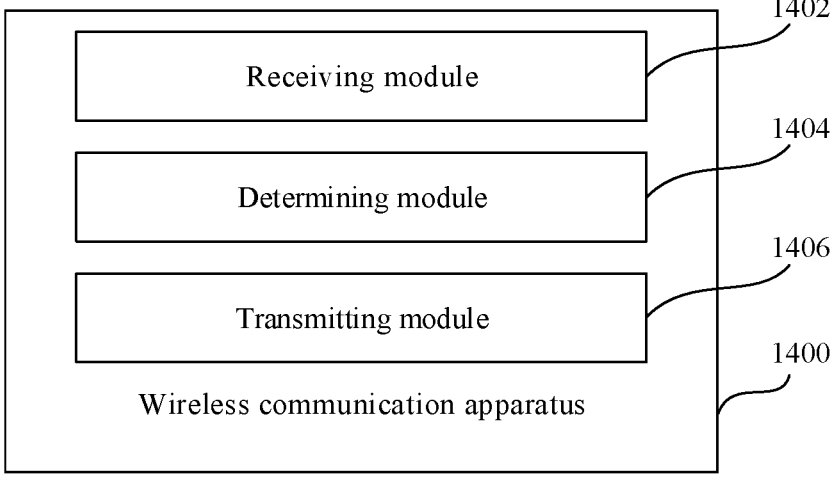
FIG. 10 is a first structural block diagram of a wireless communication apparatus according to an embodiment of this application.

In an embodiment of this application, FIG. 10 is a first structural block diagram of a wireless communication apparatus according to an embodiment of this application. The wireless communication apparatus 1400 includes a receiving module 1402, a determining module 1404, and a transmitting module 1406, where the receiving module 1402 is configured to receive a configuration parameter of Uu interface of a base station, the determining module 1404 is configured to, based on the configuration parameter, determine time information of a cell corresponding to a relay device, and the transmitting module 1406 is configured to transmit a message carrying the time information to the remote device.

Optionally, the time information includes at least one of the following: identity information of the cell, system frame number of the Uu interface, slot number of the Uu interface, OFDM symbol sequence number, subcarrier spacing, or offset between the system frame number of the Uu interface and a frame number of PC5 interface of the relay device. The message includes at least one of the following: sidelink master information block, sidelink signalling radio bearer, or discovery signal. Sidelink management information includes update indication information of the time information, so that the remote device determines the time information according to the update indication information. The cell includes at least one of the following: primary cell, secondary cell, or primary secondary cell.

Figure 11:
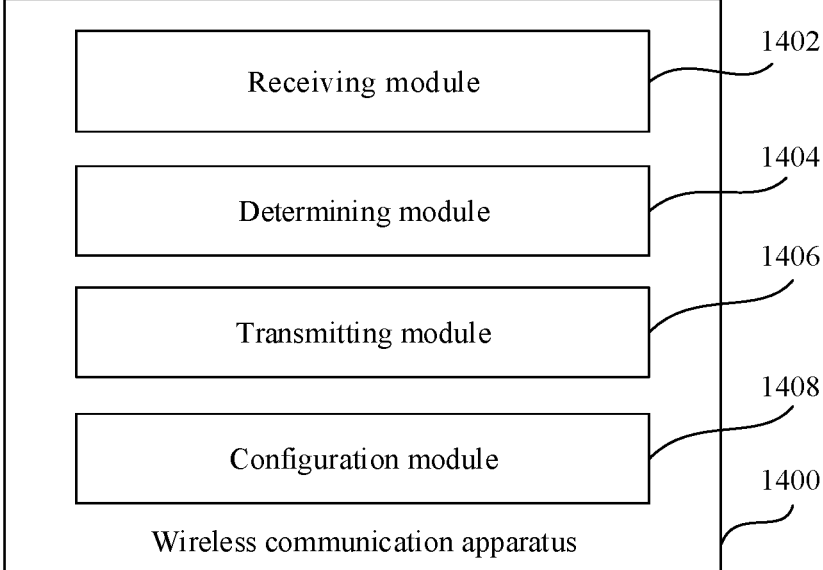
FIG. 11 is a second structural block diagram of a wireless communication apparatus according to an embodiment of this application.

Optionally, FIG. 11 is a second structural block of the wireless communication apparatus according to an embodiment of this application. The wireless communication apparatus 1400 further includes a configuration module 1408. The configuration module 1408 is configured to determine an initialization mode of the frame number of the PC5 interface of the relay device and configure the frame number of the PC5 interface according to the initialization mode. The initialization mode includes: configuring an initial value of the frame number of the PC5 interface to be a value of the system frame number of the Uu interface, or initializing the frame number of the PC5 interface according to a preset offset between the system frame number of the Uu interface and the frame number of the PC5 interface.

Optionally, the transmitting module 1406 is specifically configured to transmit first request information for the time information to the base station, and the receiving module 1402 is further configured to receive second configuration information returned by the base station, and the transmitting module 1406 is specifically configured to transmit a message to the remote device according to the second configuration information returned by the base station. The second configuration information includes at least one of the following: time configuration message, permission information, or rejection information.

Optionally, the receiving module 1402 is further configured to receive second request information transmitted by the remote device for the time information; and the transmitting module 1406 is specifically configured to transmit a message to the remote device according to the second request information.

Optionally, in a case that single connectivity is configured for the relay device, the determining module 1404 is specifically configured to determine time information of the primary cell and/or the secondary cell based on the configuration parameter. In a case that dual connectivity is configured for the relay device, the determining module 1404 is specifically configured to determine time information of the primary cell and/or the primary secondary cell based on the configuration parameter.

Optionally, the determining module 1404 is further configured to determine a propagation mode of the message, and the transmitting module 1406 is specifically configured to transmit the message to the remote device according to the propagation mode. The propagation mode includes unicast mode or broadcast mode.

In this embodiment, modules of the wireless communication apparatus 1400 perform respective functions to implement the steps of the wireless communication method according to any one of the foregoing embodiments. Therefore, the wireless communication apparatus can achieve all the beneficial effects of the wireless communication method in any one of the foregoing embodiments, and details are not repeated herein.

Figure 22:
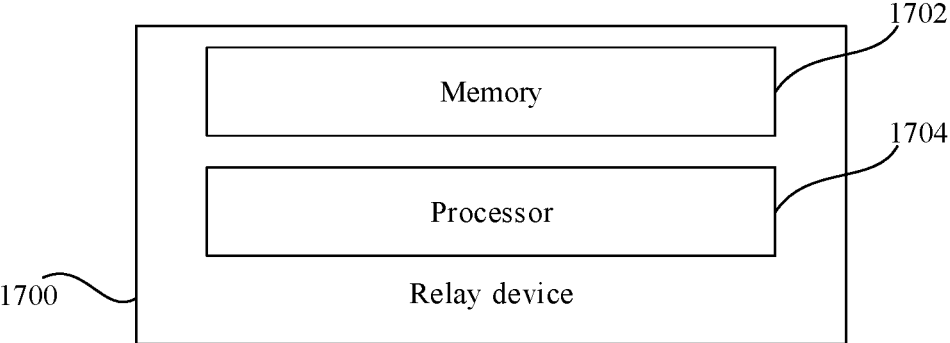
FIG. 22 is a first structural block diagram of a relay device according to an embodiment of this application.

In an embodiment of this application, as shown in FIG. 22, a relay device 1700 is provided, including a processor 1704, a memory 1702, and a program or instructions stored in the memory 1702 and capable of running on the processor 1704. When the program or instructions are executed by the processor 1704, the steps of the wireless communication method provided in any one of the foregoing embodiments are implemented. Therefore, the relay device 1700 can achieve all the beneficial effects of the wireless communication method provided in any one of the foregoing embodiments, and details are not repeated herein.

Figure 25:
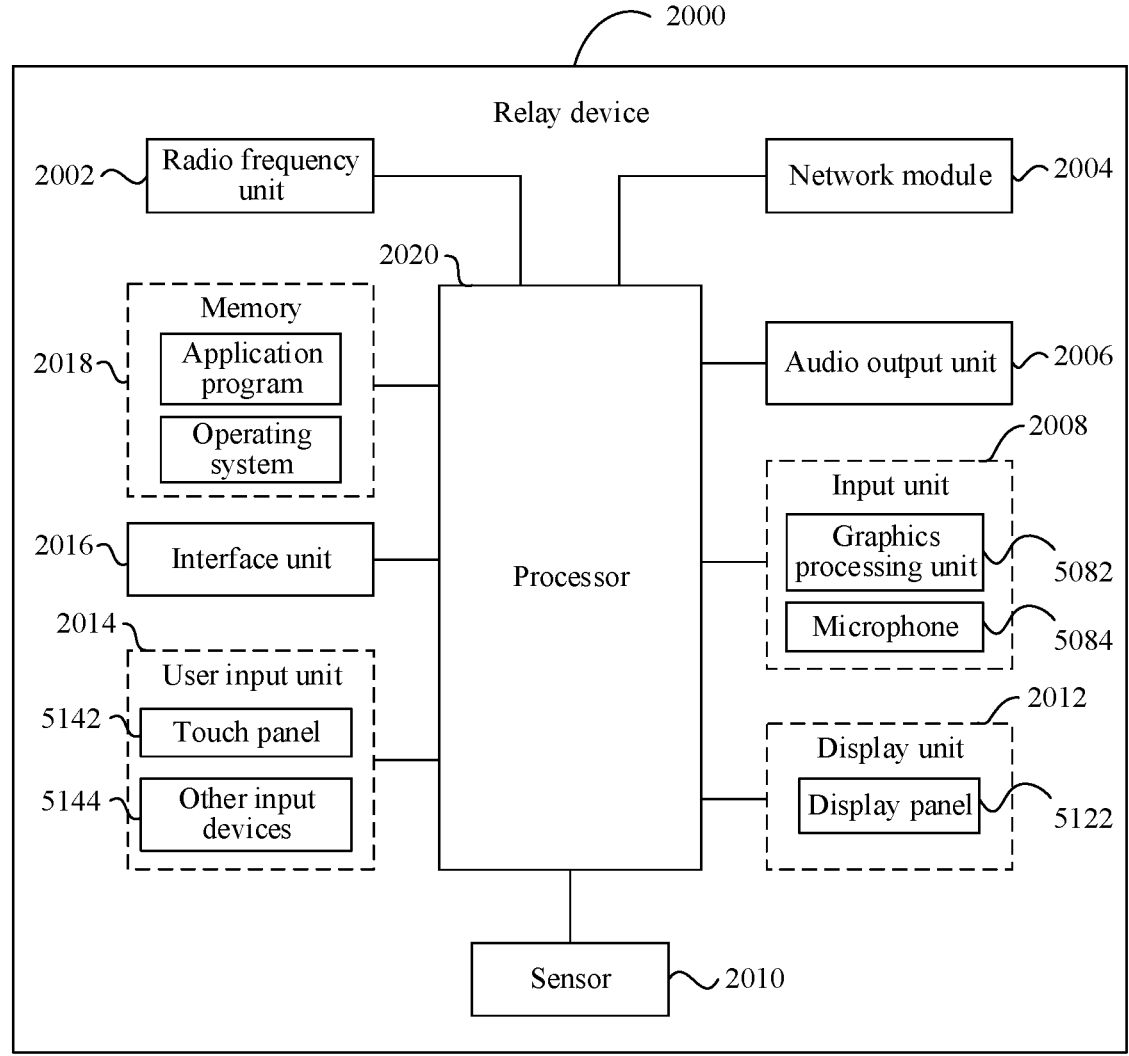
FIG. 25 is a second structural block diagram of a relay device according to an embodiment of this application.

FIG. 25 is a schematic diagram of a hardware structure of a relay device 2000 for implementing an embodiment of this application. The relay device 2000 includes but is not limited to components such as a radio frequency unit 2002, a network module 2004, an audio output unit 2006, an input unit 2008, a sensor 2010, a display unit 2012, a user input unit 2014, an interface unit 2016, a memory 2018, and a processor 2020.

Persons skilled in the art can understand that the relay device 2000 may further include a power supply (for example, a battery) supplying power to the components, and the power supply may be logically connected to the processor 2020 via a power management system. In this way, functions such as charge management, discharge management, and power consumption management are implemented via the power management system. The relay device as shown in FIG. 25 does not constitute any limitation on the relay device. The relay device may include more or fewer components than shown in the figure, or a combination of some components, or the components disposed differently. In an embodiment of this application, the relay device includes but is not limited to a mobile terminal, a tablet computer, a notebook computer, a palmtop computer, an in-vehicle electronic device, a wearable device, a pedometer, and the like.

The processor 2020 is configured to receive a configuration parameter of Uu interface of a base station and determine time information of a cell corresponding to the relay device based on the configuration parameter; and the radio frequency unit 2002 is further configured to transmit a message carrying the time information to a remote device. Therefore, even though the remote device is outside the coverage of the cell, the remote device can still determine a cell time window or understand measurement configuration based on the time information transmitted by the relay device, so as to perform measurement gap configuration and cell reselection. This reduces measurement power and measurement time of the remote device, thus improving service continuity of the remote device in a moving state.

Further, the time information includes at least one of the following: identity information of the cell, system frame number of the Uu interface, slot number of the Uu interface, OFDM symbol sequence number, subcarrier spacing, or offset between the system frame number of the Uu interface and a frame number of PC5 interface of the relay device. The message includes at least one of the following: sidelink master information block, sidelink signalling radio bearer, or discovery signal. Sidelink management information includes update indication information of the time information, so that the remote device determines the time information according to the update indication information. The cell includes at least one of the following: primary cell, secondary cell, or primary secondary cell.

Optionally, the processor 2020 is further configured to determine an initialization mode of a frame number of PC5 interface of the relay device and configure the frame number of the PC5 interface according to the initialization mode. The initialization mode includes: configuring an initial value of the frame number of the PC5 interface to be a value of the system frame number of the Uu interface, or initializing the frame number of the PC5 interface according to a preset offset between the system frame number of the Uu interface and the frame number of the PC5 interface.

Optionally, the radio frequency unit 2002 is configured to transmit first request information for the time information to the base station, receive second configuration information returned by the base station or second request information transmitted by the remote device for the time information, and transmit a message to the remote device according to the second configuration information or the second request information. The second configuration information includes at least one of the following: time configuration message, permission information, or rejection information.

Optionally, in a case that single connectivity is configured for the relay device, the processor 2020 is further configured to determine time information of the primary cell and/or the secondary cell based on the configuration parameter. In a case that dual connectivity is configured for the relay device, the processor 2020 is specifically configured to determine time information of the primary cell and/or the primary secondary cell based on the configuration parameter.

Optionally, the processor 2020 is further configured to determine a propagation mode of the message, and the radio frequency unit 2002 is configured to transmit the message to the remote device according to the propagation mode. The propagation mode includes unicast mode or broadcast mode.

It should be understood that in this embodiment of this application, the radio frequency unit 2002 may be configured to transmit/receive information or transmit/receive signals in a call process, and specially receive downlink data from the base station or transmit uplink data to the base station. The radio frequency unit 2002 includes but is not limited to an antenna, at least one amplifier, a transceiver, a coupler, a low noise amplifier, a duplexer, and the like.

The network module 2004 provides wireless broadband Internet access for a user, for example, helps the user transmit and receive e-mails, browse web pages, and access streaming media.

The audio output unit 2006 may convert audio data received by the radio frequency unit 2002 or the network module 2004 or stored in the memory 2018 into an audio signal and output the audio signal as a sound. In addition, the audio output unit 2006 may also provide audio output (for example, a call signal received sound or a message received sound) associated with a specific function performed by the relay device 2000. The audio output unit 2006 includes a speaker, a buzzer, a telephone receiver, and the like.

The input unit 2008 is configured to receive audio or video signals. The input unit 2008 may include a graphics processing unit (GPU) 5082 and a microphone 5084. The graphics processing unit 5082 processes image data of a static picture or a video obtained by an image capture apparatus (for example, a camera) in a video capture mode or an image capture mode. The image frame processed may be displayed on the display unit 2012, or stored in the memory 2018 (or another storage medium), or transmitted via the radio frequency unit 2002 or the network module 2004. The microphone 5084 can receive sound and process the sound into audio data. The processed audio data can be converted, in a telephone call mode, into a format that can be transmitted via the radio frequency unit 2002 to a mobile communication base station.

The relay device 2000 further includes at least one sensor 2010, for example, a fingerprint sensor, a pressure sensor, an iris sensor, a molecular sensor, a gyroscope, a barometer, a hygrometer, a thermometer, an infrared sensor, an optical sensor, a motion sensor, and another sensor.

The display unit 2012 is configured to display information input by the user or information provided to the user. The display unit 2012 may include a display panel 5122, and the display panel 5122 may be configured in a form of a liquid crystal display, an organic light-emitting diode display, and the like.

The user input unit 2014 may be configured to receive entered numerical or character information, and generate key signal input that is related to user setting and function control of the relay device. Specifically, the user input unit 2014 includes a touch panel 5142 and other input devices 5144. The touch panel 5142 is also referred to as a touchscreen, and can collect touch operations of the user on or near the touch panel 5142. The touch panel 5142 may include two parts: a touch detection apparatus and a touch controller. The touch detection apparatus detects a touch position of a user, detects a signal generated by the touch operation, and transmits the signal to the touch controller. The touch controller receives touch information from the touch detection apparatus, converts the touch information into touchpoint coordinates, transmits the touchpoint coordinates to the processor 2020, and receives and executes a command from the processor 2020. The other input devices 5144 may include but are not limited to a physical keyboard, a function key (such as a volume control key or a power on/off key), a trackball, a mouse, a joystick, and the like. Details are not described herein.

Further, the touch panel 5142 may cover the display panel 5122. When detecting a touch operation on or near the touch panel 5142, the touch panel 5142 transmits the touch operation to the processor 2020 to determine a type of a touch event. Then, the processor 2020 provides a corresponding visual output on the display panel 5122 based on the type of the touch event. The touch panel 5142 and the display panel 5122 can be used as two separate components, or integrated into one component.

The interface unit 2016 is an interface for connecting an external apparatus to the relay device 2000. For example, the external apparatus may include a wired or wireless headphone port, an external power (or battery charger) port, a wired or wireless data port, a memory card port, a port for connecting an apparatus with an identification module, an audio input/output (I/O) port, a video I/O port, an earphone port, and the like. The interface unit 2016 may be configured to receive an input (for example, data information or power) from an external apparatus and transmit the received input to one or more elements within the relay device 2000, or may be configured to transmit data between the relay device 2000 and the external apparatus.

The memory 2018 may be configured to store software programs and various data. The memory 2018 may mainly include a program storage area and a data storage area. The program storage area may store an operating system, and an application program required by at least one function (for example, a sound playback function or an image playback function). The data storage area may store data (for example, audio data or a phone book) created according to use of the mobile terminal. In addition, the memory 2018 may include a high-speed random access memory, and may further include a non-volatile memory, for example, at least one disk storage device, flash memory device, or other volatile solid-state storage devices.

The processor 2020 runs or executes a software program and/or module stored in the memory 2018 and calls data stored in the memory 2018 to execute various functions of the relay device 2000 and process data, so as to perform overall monitoring on the relay device 2000. The processor 2020 may include one or more processing units. The processor 2020 may integrate an application processor and a modem processor. The application processor mainly processes an operating system, a user interface, an application program, and the like. The modem processor mainly processes functions related to wireless communication.

Figures 12, 13:
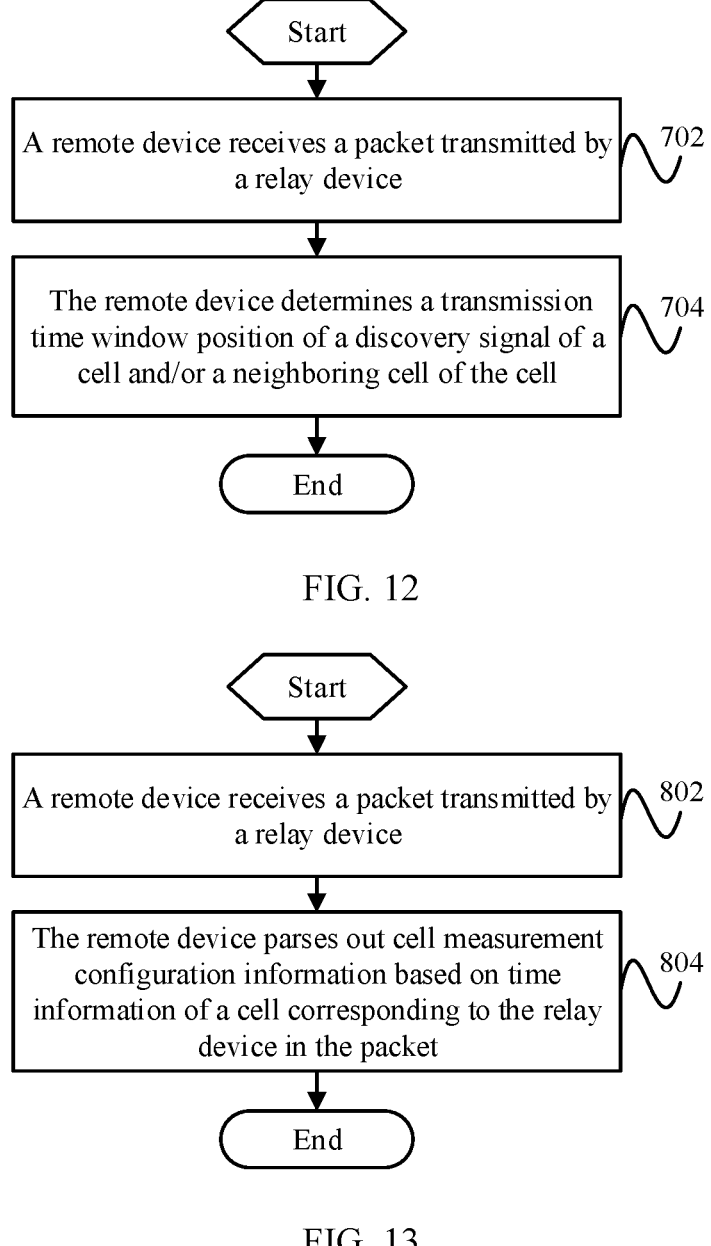
FIG. 12 is a seventh flowchart of a wireless communication method according to an embodiment of this application.
FIG. 13 is an eighth flowchart of a wireless communication method according to an embodiment of this application.

In an embodiment of this application, FIG. 12 is a seventh flowchart of a wireless communication method according to an embodiment of this application, including step 702 and step 704.

Step 702. A remote device receives a message transmitted by a relay device.

Step 704. The remote device determines a transmission time window position of a discovery signal of a cell and/or a neighboring cell of the cell.

In this embodiment, the remote device can obtain the time information of the cell via the relay device. Therefore, even though the remote device is outside the coverage of the cell, the remote device can still determine the transmission time window of the discovery signal of the cell and/or the neighboring cell of the cell, so as to perform cell reselection, thus improving service continuity of the remote device in a moving state.

In an embodiment of this application, FIG. 13 is an eighth flowchart of a wireless communication method according to an embodiment of this application, including the following steps.

Step 802. A remote device receives a message transmitted by a relay device.

Step 804. The remote device parses out cell measurement configuration information based on time information of a cell corresponding to the relay device in the message.

In this embodiment, even though the remote device is outside the coverage of the cell, the remote device can still obtain the time information of the cell via the relay device and parse out the cell measurement configuration information based on the time information, so that the remote device understands a measurement configuration of a base station. This reduces measurement power and measurement time of the remote device, thus improving service continuity of the remote device in a moving state.

In an embodiment of this application, before step 802 that the remote device receives the message transmitted by the relay device, FIG. 14 is a ninth flowchart of a wireless communication method according to an embodiment of this application, including step 902.

Step 902. The remote device transmits second request information for time information to the relay device.

The second request information contains user information of the remote device and the required time information.

In this embodiment, when needing to access a cell, the remote device needs to obtain at least time information of the cell, so as to facilitate measurement and cell reselection. In this case, the remote device can transmit the second request information for the time information to the relay device to request the relay device to provide the time information of the corresponding cell.

In an embodiment of this application, FIG. 15 is a tenth flowchart of a wireless communication method according to an embodiment of this application, including step 1002 and step 1004.

Step 1002. A remote device reads a slot number of PC5 interface of a relay device and determines a slot number of Uu interface of a base station based on the slot number of the PC5 interface.

Step 1004. The remote device reads a frame number of the PC5 interface of the relay device and determines a system frame number of the Uu interface of the base station based on the frame number of the PC5 interface.

In this embodiment, in a case that the relay device sets an initial value of the frame number of the PC5 interface to a value the same as the system frame number of the Uu interface, the remote device can obtain the system frame number of the Uu interface directly from the frame number of the PC5 interface, thus avoiding directly transmitting the system frame number of the Uu interface in the message, reducing transmission resources and improving the configuration efficiency of the remote device.

Similarly, in a case that the relay device presets a preset offset between the system frame number of the Uu interface and the frame number of the PC5 interface, that is, a correspondence between the system frame number of the Uu interface and the frame number of the PC5 interface, and initializes the frame number of the PC5 interface according to the preset offset between the system frame number of the Uu interface and the frame number of the PC5 interface, the remote device can calculate the system frame number of the Uu interface after obtaining the frame number of the PC5 interface and the preset offset.

Similarly, in a case that the relay device configures a subcarrier spacing of the PC5 interface to be a subcarrier spacing of the Uu interface, the slot number of the PC5 interface is the same as the slot number of the Uu interface, and the frame number of the PC5 interface is the same as the system frame number of the Uu interface. In this case, the remote device can obtain the system frame number and slot number of the Uu interface directly from the frame number and slot number of the PC5 interface, not requiring additional transmission of the system frame number and the slot number of the Uu interface additionally, saving, reducing transmission resources.

In an embodiment of this application, FIG. 16 is a third structural block of a wireless communication apparatus according to an embodiment of this application. The wireless communication apparatus 1500 includes a receiving module 1502 and a determining module 1504, where the receiving module 1502 is configured to receive a message transmitted by a relay device, and the determining module 1504 is configured to determine a transmission time window position of a discovery signal of a cell and/or a neighboring cell of the cell, and/or parse out cell measurement configuration information based on time information of the cell corresponding to the relay device in the message.

Optionally, the time information includes at least one of the following: identity information of the cell, system frame number of the Uu interface, slot number of the Uu interface, OFDM symbol sequence number, subcarrier spacing, or offset between the system frame number of the Uu interface and a frame number of PC5 interface of the relay device. The message includes at least one of the following: sidelink master information block, sidelink signalling radio bearer, or discovery signal. Sidelink management information includes update indication information of the time information, so that the remote device determines the time information according to the update indication information. The cell includes at least one of the following: primary cell, secondary cell, or primary secondary cell. Measurement information includes measurement configuration, measurement gap, a measurement report, and the like.

Optionally, the determining module 1504 is further configured to read a slot number of the PC5 interface of the relay device and determine the slot number of the Uu interface of the base station based on the slot number of the PC5 interface; and/or read the frame number of the PC5 interface of the relay device and determine the system frame number of the Uu interface of the base station based on the frame number of the PC5 interface.

Figure 17:
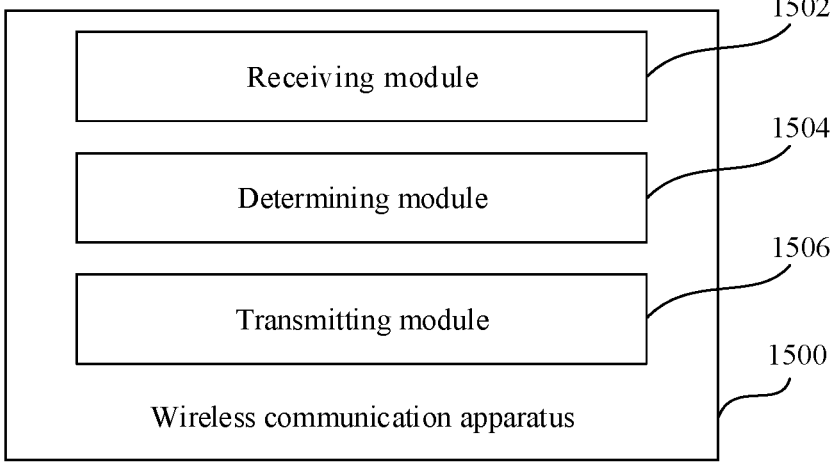
FIG. 17 is a fourth structural block diagram of a wireless communication apparatus according to an embodiment of this application.

Optionally, FIG. 17 is a fourth structural block diagram of the wireless communication apparatus according to an embodiment of this application. The wireless communication apparatus 1500 further includes a transmitting module 1506, where the transmitting module 1506 is configured to transmit second request information for the time information to the relay device.

In this embodiment, modules of the wireless communication apparatus 1500 perform respective functions to implement the steps of the wireless communication method according to any one of the foregoing embodiments. Therefore, the wireless communication apparatus can achieve all the beneficial effects of the wireless communication method in any one of the foregoing embodiments, and details are not repeated herein.

Figure 23:
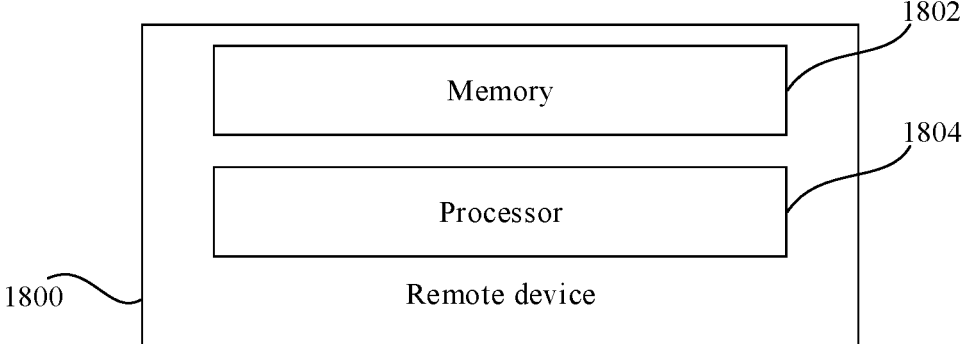
FIG. 23 is a first structural block diagram of a remote device according to an embodiment of this application.

In an embodiment of this application, as shown in FIG. 23, a remote device 1800 is provided, including a memory 1802 and a processor 1804, where the memory 1802 stores a computer program, and the processor 1804 is configured to execute the computer program to implement the steps of the wireless communication method provided in any one of the foregoing embodiments. Therefore, the remote device 1800 can achieve all the beneficial effects of the wireless communication method provided in any one of the foregoing embodiments, and details are not repeated herein.

The remote device in this embodiment of this application may be an apparatus or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The remote device in this embodiment of this application may be an apparatus having an operating system. The operating system may be an Android operating system, an iOS operating system, or another possible operating system, and is not specifically limited in the embodiments of this application.

Figure 18:
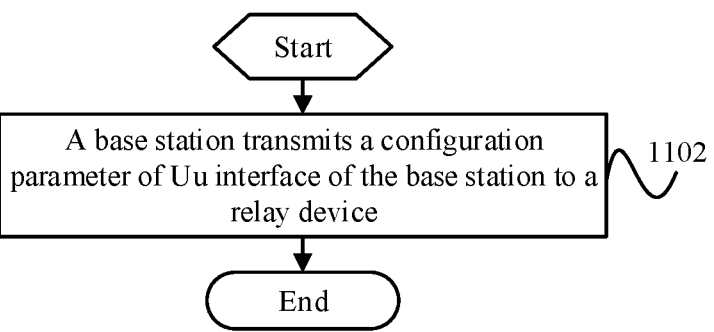
FIG. 18 is an eleventh flowchart of a wireless communication method according to an embodiment of this application.

In an embodiment of this application, FIG. 18 is an eleventh flowchart of a wireless communication method according to an embodiment of this application, including step 1102.

Step 1102. A base station transmits a configuration parameter of Uu interface of the base station to a relay device.

In this embodiment, after the base station establishes a communication link with the relay device, the base station actively transmits the configuration parameter of the Uu interface between the base station and the relay device to the relay device. After receiving the configuration parameter, the relay device generates a message containing the corresponding time information based on the configuration parameter, so as to forward the time information to the remote device. In this way, the remote device can perform measurement gap configuration and/or cell reselection based on the time information, effectively reducing constraints imposed by cell coverage and ensuring the service continuity of the remote device.

In an embodiment of this application, FIG. 19 is a twelfth flowchart of a wireless communication method according to an embodiment of this application, including step 1202, step 1204, and step 1206.

Step 1202. A base station receives first request information transmitted by a relay device for time information.

Step 1204, The base station determines second configuration information of the time information.

The second configuration information includes permission information and rejection information.

Step 1206. The base station transmits the second configuration information to the relay device.

In this embodiment, before transmitting the message carrying the time information to the remote device, the relay device first transmits the first request information for the time information to the corresponding base station to ask the base station whether to provide the time information to the remote device. The base station determines the second configuration information in response to the user operation or according to a preset communication permission and returns configuration permission information to the relay device. If confirming the configuration, the base station returns the permission information of the configuration. The relay device transmits the time information to the remote device according to the permission information returned by the base station. If rejecting the configuration, the base station returns the rejection information of the configuration. The relay device does not transmit the time information to the remote device according to the rejection information returned by the base station. In this way, an access permission of the remote device can be further set via the first request information, improving the security of the communication system.

In an embodiment of this application, FIG. 20 is a fifth structural block diagram of a wireless communication apparatus according to an embodiment of this application. The wireless communication apparatus 1600 includes a transmitting module 1602. The transmitting module 1602 is configured to transmit a configuration parameter of Uu interface of a base station to a relay device.

Optionally, the transmitting module 1602 is further configured to transmit second configuration information of time information to the relay device, where the second configuration information includes permission information and rejection information.

Figure 21:
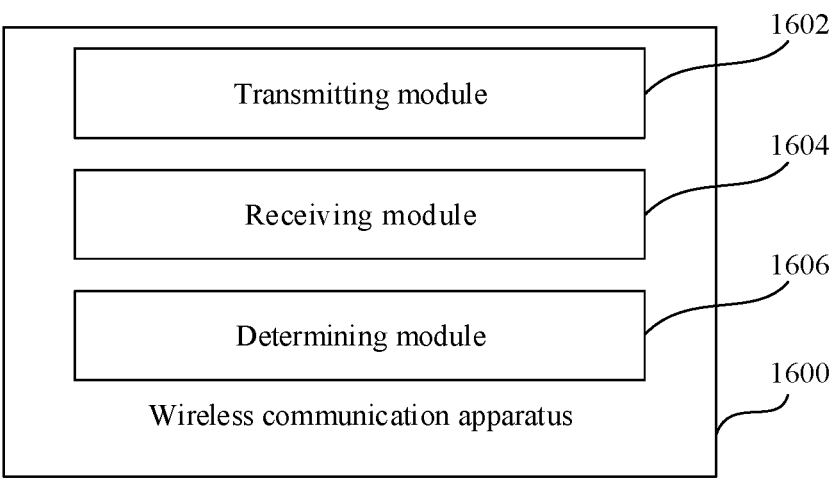
FIG. 21 is a sixth structural block diagram of a wireless communication apparatus according to an embodiment of this application.

Optionally, FIG. 21 is a sixth structural block diagram of the wireless communication apparatus according to an embodiment of this application. The wireless communication apparatus 1600 further includes a receiving module 1604 and a determining module 1606, where the receiving module 1604 is configured to receive first request information transmitted by the relay device for time information, the determining module 1606 is configured to determine second configuration information of the time information, and the transmitting module 1602 is further configured to transmit the second configuration information to the relay device.

In this embodiment, modules of the wireless communication apparatus 1600 perform respective functions to implement the steps of the wireless communication method according to any one of the foregoing embodiments. Therefore, the wireless communication apparatus can achieve all the beneficial effects of the wireless communication method in any one of the foregoing embodiments, and details are not repeated herein.

Figure 24:
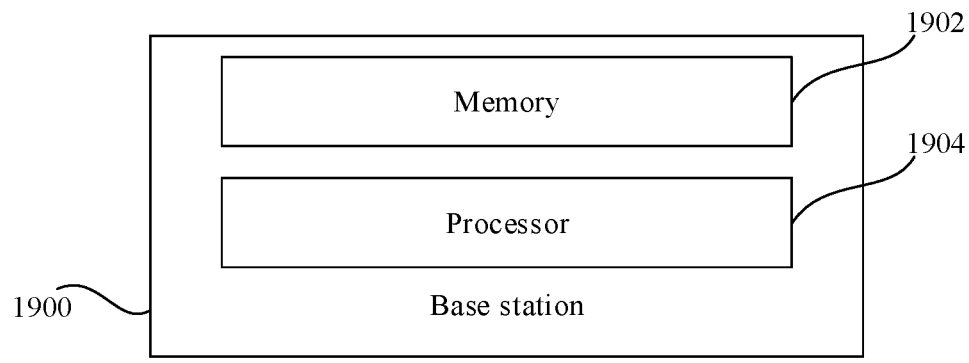
FIG. 24 is a structural block diagram of a base station according to an embodiment of this application.

In an embodiment of this application, as shown in FIG. 24, a base station 1900 is provided, including a memory 1902 and a processor 1904, where the memory 1902 stores a computer program, and the processor 1904 is configured to execute the computer program to implement the steps of the wireless communication method provided in any one of the foregoing embodiments. Therefore, the base station 1900 can achieve all the beneficial effects of the wireless communication method provided in any one of the foregoing embodiments, and details are not repeated herein.

In an embodiment of this application, a readable storage medium is provided, where the readable storage medium stores a program or instructions, and when the program or instructions are executed by a processor, the steps of the wireless communication method provided in any one of the foregoing embodiments are implemented.

In this embodiment, the readable storage medium can implement the processes of the wireless communication method provided in any embodiment of this application, with the same technical effects achieved. To avoid repetition, details are not described herein again.

The processor is the processor in the communications device in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions to implement each process of the foregoing wireless communication method embodiment, with the same technical effect achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. Unless otherwise specified, "a plurality of" refers to two or more. The terms "join", "connect", and the like should be understood in their general senses. For example, "connect" may refer to a fixed connection, or a detachable connection, or an integral connection, and "join" may refer to a direct connection or an indirect connection via an intermediate medium. The terms "first", "second", and so on are intended to distinguish between different objects but do not indicate a particular order of the objects. Persons of ordinary skill in the art can understand specific meanings of these terms in this application based on specific situations.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A wireless communication method, comprising:
receiving, by a relay device, a configuration parameter of Uu interface of a base station;
determining, by the relay device based on the configuration parameter, time information of a cell corresponding to the relay device; and
transmitting, by the relay device, a message carrying the time information to a remote device;
wherein the message is used for determining a system frame number of the Uu interface, and the time information comprises an offset, the offset being a difference in number between the system frame number of the Uu interface and a frame number of a PC5 interface of the relay device.

2. The wireless communication method according to claim 1, wherein
the time information further comprises at least one of the following: identity information of the cell, the system frame number of the Uu interface, slot number of the Uu interface, OFDM symbol sequence number of the Uu interface, or subcarrier spacing of the Uu interface.

3. The wireless communication method according to claim 2, further comprising:
determining, by the relay device, an initialization mode for the frame number of the PC5 interface of the relay device; and
configuring, by the relay device, the frame number of the PC5 interface according to the initialization mode; wherein
the initialization mode comprises: configuring an initial value of the frame number of the PC5 interface to be a value of the system frame number of the Uu interface, or initializing the frame number of the PC5 interface according to a preset offset between the system frame number of the Uu interface and the frame number of the PC5 interface.

4. The wireless communication method according to claim 3, wherein the initialization mode comprises initializing the frame number of the PC5 interface according to a preset offset between the system frame number of the Uu interface and the frame number of the PC5 interface number, and before the configuring, by the relay device, the frame number of the PC5 interface according to the initialization mode, the wireless communication method further comprises:

receiving, by the relay device, a first input to the relay device, and determining the preset offset in response to the first input; or receiving, by the relay device, first configuration information transmitted by the base station, and determining the preset offset according to the first configuration information.

5. The wireless communication method according to claim 2, further comprising:

configuring, by the relay device, a subcarrier spacing of the PC5 interface of the relay device to be the subcarrier spacing of the Uu interface.

6. The wireless communication method according to claim 1, wherein the transmitting, by the relay device, a message carrying the time information to a remote device comprises:

transmitting, by the relay device, first request information for the time information to the base station; and transmitting, by the relay device, the message to the remote device according to second configuration information returned by the base station;

or, wherein the transmitting, by the relay device, a message carrying the time information to a remote device comprises:

receiving, by the relay device, second request information transmitted by the remote device for the time information; and transmitting, by the relay device, the message to the remote device according to the second request information;

or, wherein the transmitting, by the relay device, a message carrying the time information to a remote device comprises:

determining, by the relay device, a propagation mode of the message; and transmitting, by the relay device, the message to the remote device according to the propagation mode;

wherein the propagation mode comprises unicast mode or broadcast mode.

7. The wireless communication method according to claim 6, wherein the second configuration information comprises at least one of the following: time configuration message, permission information, or rejection information.

8. The wireless communication method according to claim 6, wherein the propagation mode comprises the broadcast mode, and before the transmitting, by the relay device, a message carrying the time information to a remote device, the wireless communication method comprises:

receiving, by the relay device, third configuration information transmitted by a network device; and configuring, by the relay device, a broadcast message identifier according to the third configuration information.

9. The wireless communication method according to claim 1, wherein the message comprises at least one of the following: sidelink master information block, sidelink signalling radio bearer, or discovery signal.

10. The wireless communication method according to claim 9, wherein the message comprises a sidelink signalling radio bearer, and before the transmitting, by the relay device, a message carrying the time information to a remote device, the wireless communication method further comprises:

configuring, by the relay device, the sidelink signalling radio bearer.

11. The wireless communication method according to claim 1, wherein the cell comprises at least one of the following: primary cell, secondary cell, or primary secondary cell.

12. The wireless communication method according to claim 11, wherein the determining, by the relay device based on the configuration parameter, time information of a cell corresponding to the relay device comprises:

determining, by the relay device, time information of the primary cell and/or the secondary cell based on the configuration parameter;

or, wherein the determining, by the relay device based on the configuration parameter, time information of a cell corresponding to the relay device comprises:

determining, by the relay device, time information of the primary cell and/or the primary secondary cell based on the configuration parameter.

13. A relay device, comprising a processor, a memory, and a program or instructions stored in the memory and capable of running on the processor, wherein when the program or the instructions are executed by the processor, the steps of the wireless communication method according to claim 1 are implemented.

14. A wireless communication method, comprising:

receiving, by a remote device, a message transmitted by a relay device;

determining, by the remote device based on time information of a cell corresponding to the relay device in the message, a transmission time window position of a discovery signal of the cell and/or a neighboring cell of the cell; and/or parsing out, by the remote device, cell measurement configuration information based on the time information of the cell corresponding to the relay device in the message;

wherein the message is used for determining a system frame number of a Uu interface of a base station, and the time information comprises an offset, the offset being a difference in number between the system frame number of the Uu interface and a frame number of a PC5 interface of the relay device.

15. The wireless communication method according to claim 14, before the receiving, by a remote device, a message transmitted by a relay device, further comprising:

transmitting, by the remote device, second request information for the time information to the relay device.

16. The wireless communication method according to claim 14, further comprising:

reading, by the remote device, a slot number of the PC5 interface of the relay device, and determining a slot number of the Uu interface of the base station based on the slot number of the PC5 interface; and/or reading, by the remote device, the frame number of the PC5 interface of the relay device, and determining the system frame number of the Uu interface of the base station based on the frame number of the PC5 interface.

17. A remote device, comprising a processor, a memory, and a program or instructions stored in the memory and capable of running on the processor, wherein when the program or instructions are executed by the processor, the steps of the wireless communication method according to claim 14 are implemented.

\*    \*    \*    \*    \*